(12) United States Patent
Bradley et al.

(10) Patent No.: US 11,170,550 B2
(45) Date of Patent: Nov. 9, 2021

(54) FACIAL ANIMATION RETARGETING USING AN ANATOMICAL LOCAL MODEL

(71) Applicant: DISNEY ENTERPRISES, INC., Burbank, CA (US)

(72) Inventors: Derek Edward Bradley, Zurich (CH); Dominik Thabo Beeler, Egg (CH)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/696,925

(22) Filed: Nov. 26, 2019

(65) Prior Publication Data
US 2021/0158590 A1 May 27, 2021

(51) Int. Cl.
| | |
|---|---|
| *G06T 17/20* | (2006.01) |
| *G06T 13/40* | (2011.01) |
| *G06K 9/00* | (2006.01) |
| *G06T 19/20* | (2011.01) |

(52) U.S. Cl.
CPC .......... *G06T 13/40* (2013.01); *G06K 9/00281* (2013.01); *G06K 9/00315* (2013.01); *G06T 17/20* (2013.01); *G06T 19/20* (2013.01); *G06T 2207/10016* (2013.01); *G06T 2207/30021* (2013.01)

(58) Field of Classification Search
None
See application file for complete search history.

(56) References Cited

U.S. PATENT DOCUMENTS

| | | | |
|---|---|---|---|
| 2008/0231640 A1* | 9/2008 | Pighin | G06T 3/0093 |
| | | | 345/619 |
| 2017/0091994 A1* | 3/2017 | Beeler | G06T 17/20 |

OTHER PUBLICATIONS

Beeler et al."Rigid Stabilization of Facial Expressions", ACM Transactions on Graphics, vol. 33, No. 4, Article 44, Publication Date: Jul. 2014 pp. 44:1-44:9.

Beeler et al., "High-Quality Single-Shot Capture of Facial Geometry", ACM Transactions on Graphics, vol. 29, No. 4, Article 40, Publication date: Jul. 2010, pp. 40:1-40:9.

Beeler et al., "High-Quality Passive Facial Performance Capture using Anchor Frames", ACM Transactions on Graphics, vol. 30, No. 4, Article 75, Publication date: Jul. 2011, pp. 75:1-75:10.

(Continued)

*Primary Examiner* — Nicholas R Wilson
(74) *Attorney, Agent, or Firm* — Artegis Law Group, LLP

(57) ABSTRACT

A retargeting engine automatically performs a retargeting operation. The retargeting engine generates an anatomical local model of a digital character based on performance capture data and/or a 3D model of the digital character. The anatomical local model includes an anatomical model corresponding to internal features of the digital character and a local model corresponding to external features of the digital character. The retargeting engine includes a Machine Learning model that maps a set of locations associated with the face of a performer to a corresponding set of locations associated with the face of the digital character. The retargeting engine includes a solver that modifies a set of parameters associated with the anatomical local model to cause the digital character to exhibit one or more facial expressions enacted by the performer, thereby retargeting those facial expressions onto the digital character.

20 Claims, 4 Drawing Sheets

(56) References Cited

OTHER PUBLICATIONS

Black et al., "Tracking and Recognizing Rigid and Non-Rigid Facial Motions using Local Parametric Models of Image Motion", In International Conference on Computer Vision, pp. 374-381, 1995.
Blanz et al., "A Morphable Model for The Synthesis of 3D Faces", SIGGRAPH '99: Proceedings of the 26th annual conference on Computer graphics and interactive techniques Jul. 1999, pp. 187-194.
Bouaziz et al., "Online Modeling for Realtime Facial Animation", ACM Transactions on Graphics, vol. 32, No. 4, Article 40, Publication Date: Jul. 2013, pp. 40:1-40:10.
Bradley et al., "High Resolution Passive Facial Performance Capture", ACM Transactions on Graphics, vol. 29, No. 4, Article 41, Publication date: Jul. 2010, pp. 41:1-41:10.
Bregler et al., "Twist Based Acquisition and Tracking of Animal and Human Kinematics", International Journal of Computer Vision vol. 56, No. 3, 2004, pp. 179-194.
Brox et al., "High Accuracy Optical Flow Estimation Based on a Theory for Warping", In European Conference on Computer Vision pp. 25-36, 2004.
Brunton et al., "Multilinear Wavelets: A Statistical Shape Space for Human Faces" In European Conference on Computer Vision, 2014, pp. 297-312.
Cao et al., 3D Shape Regression for Real-time Facial Animation regression for real-time facial animation. ACM Transactions on Graphics, vol. 32, No. 4, Article 41, Publication Date: Jul. 2013, pp. 41:1-41:10.
Cao et al., "Displaced Dynamic Expression Regression for Real-time Facial Tracking and Animation", ACM Transactions on Graphics, vol. 33, No. 4, Article 43, Publication Date: Jul. 2014, pp. 43:1-43:10.
Cao et al., "Real-Time High-Fidelity Facial Performance Capture", ACM Transactions on Graphics, vol. 34, No. 4, Article 46, Publication Date: Aug. 2015, pp. 46:1-46:9.
Chen et al., "Accurate and Robust 3D Facial Capture Using a Single RGBD Camera", In International Conference on Computer Vision, pp. 3615-3622, 2013.
Cootes et al., "Active Appearance Models", IEEE Transactions on Pattern Analysis and Machine Intelligence, vol. 23, No. 6, Jun. 2001, pp. 681-685.
DeCarlo et al., "The Integration of Optical Flow and Deformable Models with Applications to Human Face Shape and Motion Estimation", In Conference on Computer Vision and Pattern Recognition, 1996, pp. 231-238.
Essa et al., "Modeling, Tracking and Interactive Animation of Faces and Heads using Input from Video", In Process of Computer Animation, 1996, 12 pages.
Fyffe et al., "Driving High-Resolution Facial Scans with Video Performance Capture", 2014 ACM Transactions on Graphics, https://doi.org/10.1145/2638549, Dec. 2014, vol. 34, No. 1, pp. 8:1-8:14.
Garrido et al., "Reconstructing Detailed Dynamic Face Geometry from Monocular Video", ACM Transactions on Graphics, vol. 32, No. 6, Article 158, Publication Date: Nov. 2013, pp. 158:1-158:10.
Ghosh et al., "Multiview Face Capture using Polarized Spherical Gradient Illumination",. ACM Transactions on Graphics, vol. 30, No. 6, Article 129, Publication date: Dec. 2011, pp. 129:1-129:10.
Huang et al., "Leveraging Motion Capture and 3D Scanning for High-fidelity Facial Performance Acquisition", ACM Transactions on Graphics, vol. 30, No. 4, Article 74, Publication date: Jul. 2011, pp. 74:1-74:10.

Joshi et al., "Learning Controls for Blend Shape Based Realistic Facial Animation", SIGGRAPH '06: ACM SIGGRAPH 2006 Courses, https://doi.org/10.1145/1185657.1185857, pp. 187-192.
Kobbelt et al., "Multiresolution Hierarchies on Unstructured Triangle Meshes", Computational Geometry: Theory and Applications, https://doi.org/10.1016/S0925-7721(99)00032-2, vol. 14, Issues 1-3, Nov. 30, 1999, pp. 5-24.
Lau et al., "Face Poser: Interactive Modeling of 3D Facial Expressions Using Facial Priors", ACM Transactions on Graphics, vol. 29, No. 1, Article 3, Publication date: Dec. 2009, pp. 3:1-3:17.
Lewis et al., "Practice and Theory of Blendshape Facial Models", In EUROGRAPHICS 2014—State of the Art Report, 20 pages.
Li et al., "3-D Motion Estimation in Model-Based Facial Image Coding", IEEE Transactions on Pati'ern Analysis and Machine Intelligence, vol. 15, No. 6, Jun. 1999, pp. 545-555.
Li et al., "Realtime Facial Animation with On-the-fly Correctives", ACM Transactions on Graphics, (Proc. SIGGRAPH) vol. 32, No. 4, pp. 42:1-42:10, 2013.
Na et al., "Local shape blending using coherent weighted regions", The Visual Computer vol. 27, Article No. 575, Published: May 4, 2011, pp. 575-584.
Neumann et al., "Sparse Localized Deformation Components", ACM Transactions on GraphicsNov. 2013 Article No. 179, pp. 179:1-179:10.
Rhee et al., "Real-time Facial Animation from Live Video Tracking", SCA '11: Proceedings of the 2011 ACM SIGGRAPH/ Eurographics Symposium on Computer Animation, https://doi.org/10.1145/2019406.2019435, Aug. 2011, pp. 215-224.
Saragih et al., "Deformable Model Fitting by Regularized Landmark Mean-Shift", International Journal of Computer Vision, Jan. 2011, DOI 10.1007/s11263-010-0380-4, vol. 91, No. 2, pp. 200-215.
Shi et al., "Automatic Acquisition of High-fidelity Facial Performances Using Monocular Videos", ACM Transactions on Graphics, vol. 33, No. 6, Article 222, Publication Date: Nov. 2014, pp. 222:1-222:13.
Suwajanakorn et al., "Total Moving Face Reconstruction", In European Conference on Computer Vision, pp. 796-812, 2014.
Tena et al, "Interactive Region-Based Linear 3D Face Models", ACM Transactions on GraphicsJul. 2011 Article No. 76 https://doi.org/10.1145/2010324.1964971, vol. 30, No. 4, pp. 76:1-76:10.
Valgaerts et al., "Lightweight Binocular Facial Performance Capture under Uncontrolled Lighting", ACM Transactions on GraphicsNov. 2012 Article No. 187, vol. 31, No. 6, 11 pages.
Vlasic et al., "Face Transfer with Multilinear Models", ACM Transactions on GraphicsJul. 2005, https://doi.org/10.1145/1073204.1073209, vol. 24, No. 3, pp. 426-433.
Weise et al., "Face/Off: Live Facial Puppetry", Eurographics/ ACM SIGGRAPH Symposium on Computer Animation (2009) pp. 7-16.
Weise et al., "Realtime Performance-Based Facial Animation", ACM Transactions on Graphics, https://doi.org/10.1145/2010324.1964972, Jul. 2011 Article No. 77, vol. 30, No. 4, pp. 77:1-77:10.
Zhang et al., "Spacetime Faces: High Resolution Capture for Modeling and Animation", ACM Transactions on GraphicsAug. 2004, https://doi.org/10.1145/1015706.1015759, pp. 548-558.
Zollhöfer et al., "Real-time Non-rigid Reconstruction using an RGB-D Camera", ACM Transactions on Graphics, vol. 33, No. 4, Article 156, Publication Date: Jul. 2014, vol. 33, No. 4, pp. 156:1-156:12.
J.C. Gower, "Generalized Procrustes Analysis", Psychometrika vol. 40, No. 1 Mar. 1975.

* cited by examiner

FACIAL ANIMATION RETARGETING USING AN ANATOMICAL LOCAL MODEL

BACKGROUND

Field of the Various Embodiments

The various embodiments relate generally to computer science and computer animation and, more specifically, to facial animation retargeting using an anatomical local model.

Description of the Related Art

Certain types of computer animation pipelines include a motion capture phase and a digital rendering phase. During the motion capture phase, a human performer enacts a performance within a motion capture environment. The motion capture environment typically includes multiple video cameras that are positioned at different angles relative to the performer and are configured to capture three-dimensional (3D) motion capture data as the performer enacts the performance. Subsequently, during the digital rendering phase, digital rendering techniques are used to process the 3D motion capture data to generate a 3D geometric model of the performer enacting the performance. A computer animation of the performance is then rendered based on the 3D geometric model.

Computer animation pipelines also can be implemented to generate computer animations representing the faces of digital characters exhibiting various facial expressions. For example, the motion capture phase of a computer animation pipeline could be implemented to generate 3D motion capture data representing a human performer enacting a sequence of facial expressions during a performance. Subsequently, the digital rendering phase of the computer animation pipeline could be implemented to generate a 3D geometric model of the human performer enacting the sequence of facial expressions. A computer animation of the sequence of facial expressions could then be rendered for a given digital character based on the 3D geometric model.

In many cases, however, the physical appearance of the human performer can be quite a bit different than the physical appearance of the digital character rendered as part of the computer animation. For example, the human performer could have the appearance of a human being, while the digital character could have the appearance of an animal or a mythical creature. To address these types of differences in physical appearance, the digital rendering phase of the computer animation pipeline can include various retargeting operations, which involve mapping a 3D geometric model of the human performer enacting a sequence of facial expressions onto a 3D geometric model of a digital character. A computer animation of the sequence of facial expressions is then rendered based on the 3D geometric model of the digital character.

Retargeting operations are typically performed by artists using various computer animation tools. For example, with current techniques, an artist visually inspects the 3D geometric model of the human performer enacting a given facial expression. The artist then uses a computer animation tool to iteratively arrange, in a trial-and-error fashion, hundreds or thousands of individual geometric shapes included in the 3D geometric model of the digital character until the digital character exhibits the given facial expression.

One drawback of the above approach is that iteratively arranging hundreds or thousands of individual geometric shapes using trial-and-error is a fundamentally inaccurate and error-prone process that can produce digital characters that do not faithfully exhibit the facial expressions enacted by human performers. In particular, due to the inherent complexity of human facial expressions, the above approach cannot reliably or deterministically produce arrangements of geometric shapes corresponding to most facial expressions. Consequently, digital characters that are generated using conventional retargeting techniques oftentimes appear insufficiently expressive and/or unrealistic. This problem is exacerbated when the facial geometry of the human performer and the facial geometry of the digital character substantially differ. In such cases, the artist usually is unable to generate an accurate mapping between the 3D geometric model of the human performer and the 3D geometric model of the digital character because one or more physical aspects of the facial geometry of the human performer are absent in the facial geometry of the digital character or vice versa. Accordingly, conventional retargeting operations typically can be implemented with reasonable accuracy only in cases where the digital characters and the corresponding human performers have similar facial geometries.

More recent improvements to computer animation tools allow more detailed geometric models of human performers depicting a wider range of facial expressions to be generated. However, generating a more detailed geometric model of a given human performer is a computationally complex process that usually involves capturing hundreds or thousands of facial scans of the human performer. Further, using these types of geometric models usually does not improve the accuracy with which an artist can arrange the individual geometric shapes associated with the digital character to cause the digital character to exhibit a given facial expression. Using these types of geometric models also does not necessarily enable the artist to retarget a given facial expression onto a wider range of digital characters.

As the foregoing illustrates, what is needed in the art are more effective ways to retarget facial geometries when rendering digital characters based on human performers.

SUMMARY

Various embodiments include a computer-implemented method for generating computer animations of digital characters, including generating a first model of a facial area of a first character based on first geometry, wherein the first geometry represents a facial area of the first character when the first character exhibits a range of facial expressions, determining a target position for a first surface associated with the facial area of the first character based on second geometry, wherein the second geometry indicates a source position associated with a facial area of a second character when the second character enacts a first facial expression, modifying the first model until the first surface intersects the target position to generate a second model of the facial area of the first character, and rendering a computer animation of the first character based on the second model.

At least one technical advantage of the disclosed techniques relative to the prior art is that the disclosed techniques enable facial expressions made by a performer to be more accurately retargeted onto a digital character. Accordingly, computer animations can be generated that include digital characters having more realistic facial expressions that are more closely derived from human performers than computer animations generated using prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
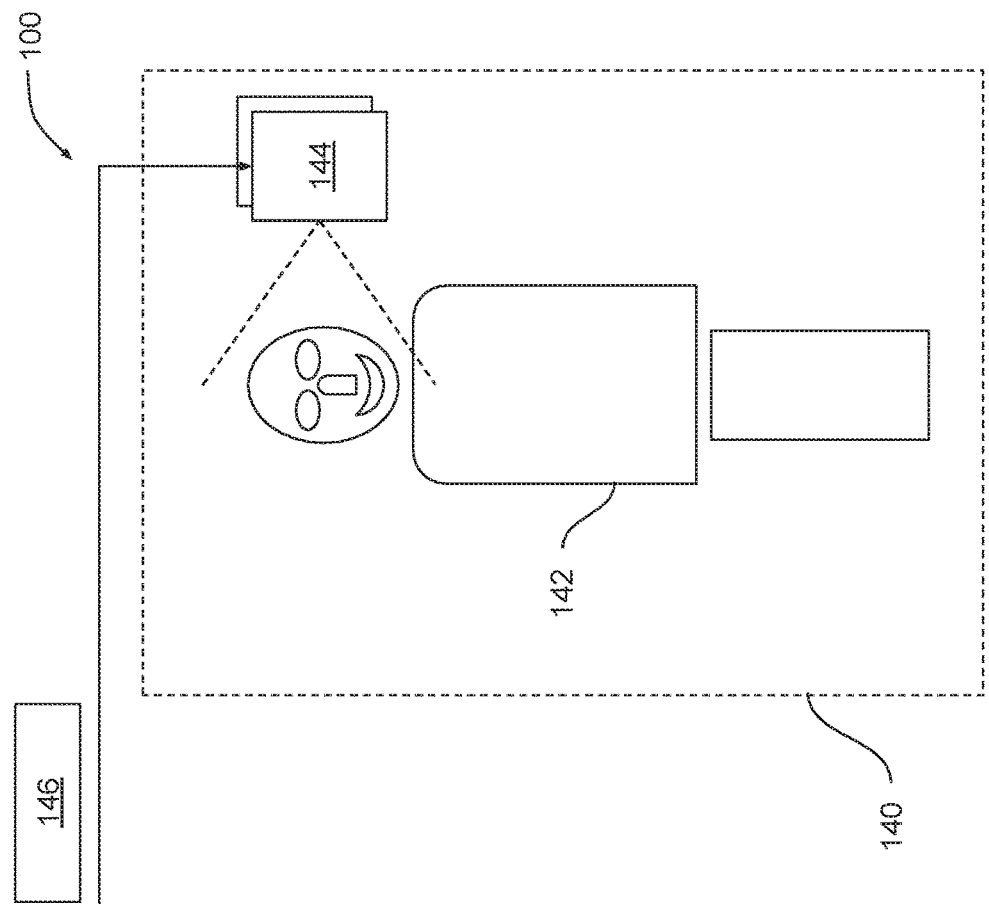
FIG. 1 illustrates a system configured to implement one or more aspects of the various embodiments.
Figure 1:
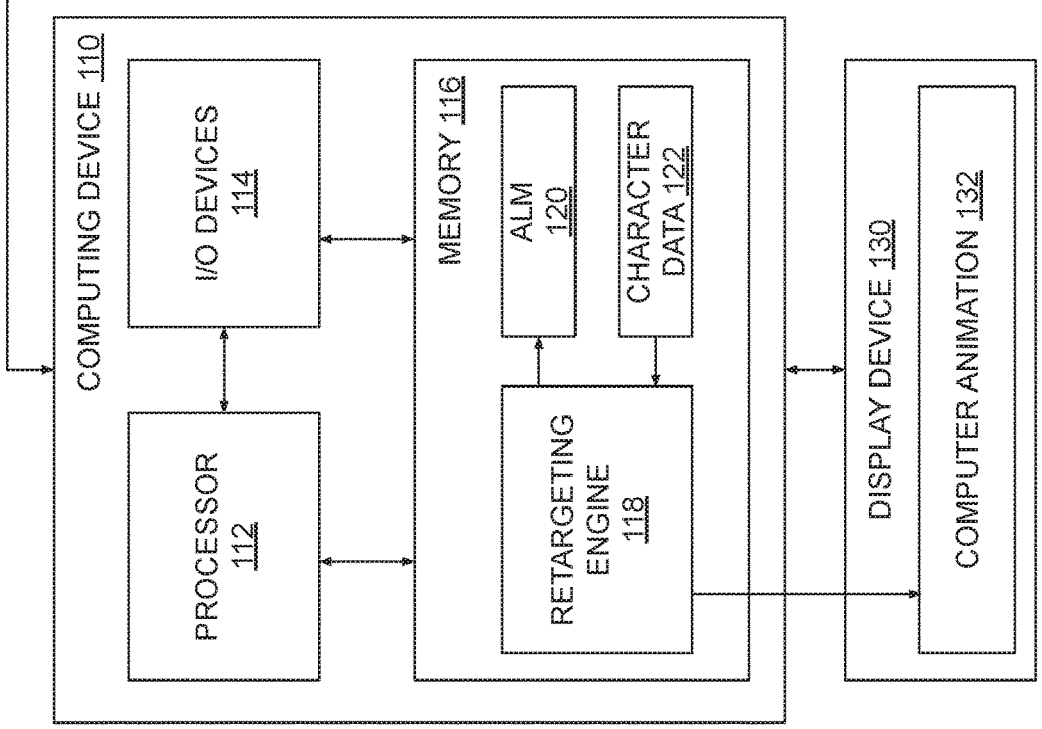

In the following description, numerous specific details are set forth to provide a more thorough understanding of the various embodiments. However, it will be apparent to one skilled in the art that the inventive concepts may be practiced without one or more of these specific details.

As noted above, various techniques can be applied to capture one or more facial expressions enacted by a human performer and render a digital character to exhibit those facial expressions. When the physical appearance of the human performer is different than the physical appearance of the digital character, a retargeting operation can be performed to map a 3D geometric model of the human performer enacting the facial expressions onto a 3D geometric model of the digital character.

However, mapping the 3D geometric model of the human performer onto the 3D geometric model of the digital character is usually an inaccurate and error prone process, especially when the human performer and the digital character differ substantially in terms of facial geometry. With current techniques, an artist has to iteratively arrange hundreds or thousands of individual shapes included in the 3D geometric model of the digital character to cause the digital character to exhibit a given facial expression. Due to the inherent complexity of human facial expressions, digital characters that are generated using the above techniques oftentimes appear insufficiently expressive and/or unrealistic.

To address these issues, various embodiments include a retargeting engine that is configured to automatically perform a retargeting operation. The retargeting engine generates or obtains a set of sample expressions that represent one or more facial expressions enacted by a performer. The retargeting engine also generates or obtains a set of character expressions that represent a digital character exhibiting the one or more facial expressions.

Based on the sample expressions and the character expressions, the retargeting engine generates an anatomical local model of the digital character. The anatomical local model includes an anatomical model corresponding to internal features of the digital character and a local model corresponding to external features of the digital character. The retargeting engine includes a Machine Learning model that is trained, based on the sample expressions and the character expressions, to map a set of locations associated with the face of the performer during a performance to a corresponding set of locations associated with the face of the digital character. The retargeting engine includes a solver that modifies a set of parameters associated with the anatomical local model to interpolate any remaining locations associated with the face of the digital character, thereby causing the digital character to exhibit one or more facial expressions enacted by the performer.

At least one technical advantage of the disclosed techniques relative to the prior art is that the disclosed techniques enable facial expressions made by a performer to be more accurately retargeted onto a digital character. Accordingly, computer animations can be generated that include digital characters having more realistic facial expressions that are more closely derived from human performers than computer animations generated using prior art approaches. Another technical advantage of the disclosed techniques relative to the prior art is that the disclosed techniques enable retargeting operations to be reliably performed even when the digital characters and the corresponding human performance have substantially different facial geometries. Accordingly, with the disclosed techniques the facial expressions of human performers can be mapped with reasonable accuracy onto a wider variety of digital characters than is possible with prior art approaches. These technical advantages represent one or more technological advancements over prior art approaches.

System Overview

FIG. 1 illustrates a system configured to implement one or more aspects of the various embodiments. As shown, a system 100 includes a computing device 110, a display device 130, and a performance capture environment 140. Computing device 110 may be any technically feasible type of computer system, including a desktop computer, a laptop computer, a mobile device, a virtualized instance of a computing device, a distributed and/or cloud-based computer system, and so forth. Display device 130 may be any technically feasible device configured to display video and/or other types of graphics. Performance capture environment 140 may be any technically feasible setup for capturing and/or recording the physical motions of one or more subjects, including a film studio, a motion capture studio, a chroma key compositing screen, and so forth.

Computing device 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs) or one or more graphics processing units (CPUs). I/O devices 114 include any technically feasible set of devices configured to perform input and/or output operations, including, for example, a display device, a keyboard, or a touchscreen, among others. Memory 116 includes any technically feasible storage media configured to store data and software applications, such as, for example, a hard disk, a random-access memory (RAM) module, and a read-only memory (ROM). Memory 116 includes a retargeting engine 118, an anatomical local model (ALM) 120, and character data 122, described in greater detail below.

Performance capture environment 140 includes various components that perform one or more capture operations relative to a set of facial expressions enacted by a performer 142. Performance capture environment 140 includes one or more capture devices 144 that are configured to record performance capture data 146 and to transmit performance capture data 146 to retargeting engine 118. Performance capture data 146 depicts the face of performer 142 while performer 142 enacts the set of facial expressions. In one embodiment, performance capture data 146 may include two-dimensional (2D) optical data captured via one capture device 144. In another embodiment, performance capture data 146 may include 3D optical data captured via multiple capture devices 144. In yet another embodiment, one or more capture devices 144 may be configured to perform one or more post-processing operations in order to generate 3D geometry that represents the face of performer 142 while performer 142 enacts the set of facial expressions.

In operation, retargeting engine 118 processes performance capture data 146 and/or character data 122 to generate ALM 120. Character data 122 includes data that specifies one or more physical attributes of a digital character onto which one or more facial expressions are mapped during a retargeting operation. Character data 122 can include a set of images, 3D geometry associated with the face and/or other portions of the digital character, and so forth. The physical appearance of the digital character may coincide with the physical appearance of performer 142 or differ substantially from the physical appearance of performer 142. ALM 120 describes how the physical appearance of the digital character changes when the digital character exhibits different facial expressions and is used to perform the retargeting operation mentioned above.

In various embodiments, to generate ALM 120, retargeting engine 118 may extract portions of performance capture data 146 that depict performer 142 enacting a range of facial expressions and then generate ALM 120 to resemble, at least in part, the physical appearance of performer 142. Retargeting engine 118 may also generate an initial version of ALM 120 based on character data 122 and then update that initial version relative to portions of performance capture data 146 that depict performer 142 enacting the range of facial expressions.

Upon generating ALM 120, retargeting engine 118 trains a Machine Learning model to map source locations associated with a facial expression enacted by performer 142 to target locations associated with the surface of ALM 120. Retargeting engine 118 then deforms ALM 120, via modification of one or more parameters, until the surface of ALM 120 coincides with the set of target locations. Retargeting engine 118 then renders a computer animation 132 based on ALM 120 to reflect the digital character exhibiting the facial expression enacted by performer 142, thereby retargeting that facial expression onto the digital character. These techniques are described in greater detail below in conjunction with FIGS. 2-4.

Software Overview

Figure 2:
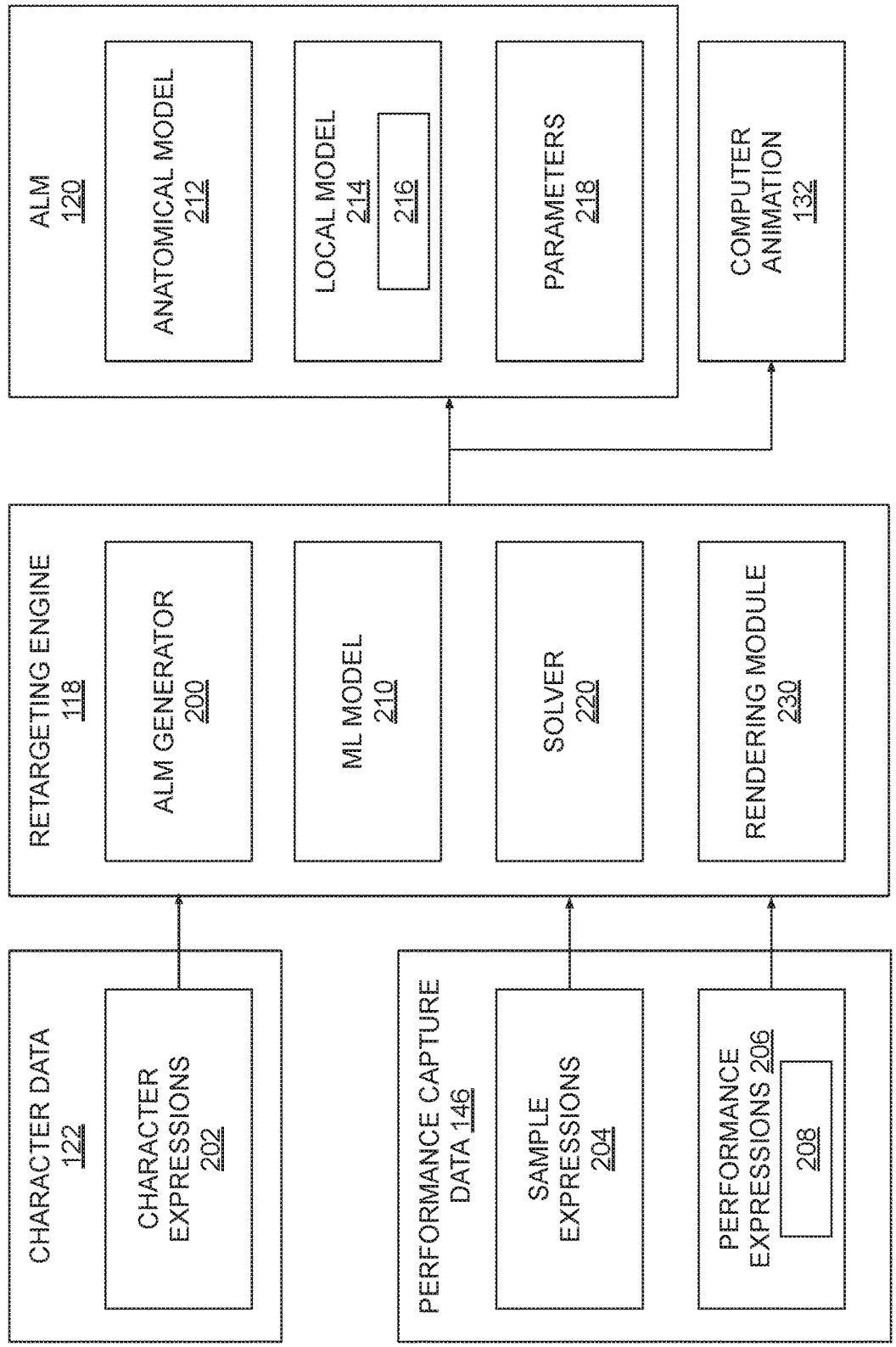
FIG. 2 includes more detailed illustrations of the retargeting engine and the anatomical local model of FIG. 1, according to various embodiments.

FIG. 2 includes more detailed illustrations of the retargeting engine and the anatomical local model of FIG. 1, according to various embodiments. As shown, retargeting engine 118 includes an ALM generator 200, an ML model 210, a solver 220, and a rendering module 230. As also shown, ALM 120 includes an anatomical model 212, a local model 214, and a set of parameters 218.

In operation, ALM generator 200 obtains character data 122 and performance capture data 146 and, based on this data, generates ALM 120. Performance capture data 146 includes sample expressions 204 that represent performer 142 enacting a range of facial expressions. A given sample expression 204 can include a 2D image of performer 142 enacting a given facial expression, 3D geometry generated based on one or more scans of performer 142 enacting a given facial expression, and so forth. In one embodiment, retargeting engine 118 may process sample expressions 204 to generate 3D geometry associated with performer 142.

Character data 122 includes data that specifies the physical appearance and/or facial geometry of the digital character, as mentioned above in conjunction with FIG. 1. Character data 122 also includes a set of character expressions 202. A given character expression 202 represents the digital character exhibiting one of the facial expressions enacted by performer 142 when sample expressions 204 are generated. Each character expression 202 can be an image of the digital character exhibiting a corresponding facial expression, 3D geometry that defines the surface of the digital character when exhibiting a corresponding facial expression, and so forth. Character expressions 202 can be generated via any technically feasible approach. In one embodiment, each character expression 202 is generated using a 3D model of the digital character.

ALM generator 200 generates anatomical model 212, local model 214, and parameters 218 when generating ALM 120. Anatomical model 212 generally describes the internal structure of the digital character, including the skull, jaw, and possibly other skeletal features of the digital character. Anatomical model 212 also specifies the structural mechanics and dynamics of the digital character when exhibiting facial expressions, including how any portions or skeletal features of anatomical model 212 move relative to one another. For example, anatomical model 212 could specify how the jaw of the digital character moves relative to the skull of the digital character when the digital character exhibits a given facial expression. ALM generator 200 can generate anatomical model 212 based on an approximation of the skeletal features of performer 142 and then modifying these features based on character data 122.

Local model 214 generally describes the external surface of the digital character, including the skin and other soft tissue features. Local model 214 also specifies the skin deformation properties of the digital character when exhibiting facial expressions. ALM generator 200 generates local model 214 by determining a set of 3D shapes that small, adjacent patches of the digital character assume when the digital character exhibits different facial expressions. Parameters 218 set forth different values that define how anatomical model 212 and local model 214 relate to one another. Parameters 218 can be modified in order to manipulate and/or or deform ALM 120.

ML model 210 defines a mapping between facial areas of performer 142 and facial areas of the digital character. ML model 210 is trained to map the position of one or more facial areas of performer 142 to one or more corresponding facial areas associated with the digital character based on sample expressions 204 and character expressions 202. In particular, for a given facial expression enacted by performer 142 and depicted in sample expressions 204, ML model 210 is trained to identify a set of source positions associated with one or more facial areas of performer 142. Further, for a corresponding facial expression exhibited by the digital character and depicted in character expressions 202, ML model 210 is trained to determine a set of target positions that correspond to the set of source positions. Thus, for a given set of source positions associated with any given facial expression enacted by performer 142, ML model 210 can predict a corresponding set of target positions associated with a corresponding facial expression exhibited by the digital character. In one embodiment, a facial tracking system may generate the set of source positions instead of ML model 210, and ML model 210 may be trained to generate the set of target positions when provided with the set of source positions by the facial tracking system. Retargeting engine 118 can implement any technically feasible training approach when training ML model 210.

Once ML model 210 is trained in the manner described above, retargeting engine 118 can obtain performance expressions 206 that represent performer 142 enacting a sequence of facial expressions during a performance. A given performance expression 206 can include a 2D image of performer 142 enacting a given facial expression, 3D geometry generated to represent performer 142 enacting the given facial expression, and so forth. In one embodiment, retargeting engine 118 may process character expressions 206 to generate 3D geometry associated with performer 142. Retargeting engine 118 generally operates to retarget the facial expressions set forth in performance expressions 206 onto the digital character described via ALM 120.

In so doing, retargeting engine 118 implements ML model 210 to determine a set of source positions 208 that are associated with one or more facial areas of performer 142 and included in performance expressions 206. ML model 210 predicts a corresponding set of target positions 216 that are associated with one or more corresponding facial areas of the digital character. Target positions 216 are located on or near the surface of the digital character and therefore may be specified to reside in local model 214.

Based on target positions 216, solver 220 is configured to modify parameters 218 in order to deform anatomical model 212 and/or local model 214 until the surface of local model 214 coincides with target positions 216. In one embodiment, solver 220 may be a parameter optimization module. When modifying parameters 218, solver 220 interpolates between target positions 216 in order to cause the digital character to assume the facial expressions set forth in performance expressions 206, thereby retargeting those facial expressions onto the digital character. Rendering module 230 can then render computer animation 132 based on ALM 120 once modified in this manner.

Advantageously, the above techniques can be implemented based on a smaller set of sample expressions and corresponding character expressions than possible with conventional techniques. In particular, conventional techniques may operate based on hundreds or thousands of sample expressions and corresponding character expressions, whereas the disclosed techniques can be implemented with as few as ten sample expressions and corresponding character expressions. In one embodiment, the above techniques may be implemented based on still imagery and need not be implemented using performance capture data. An example of how retargeting engine 118 performs the above techniques is described in greater detail below in conjunction with FIG. 3.

Example Retargeting of Facial Expressions

Figure 3:
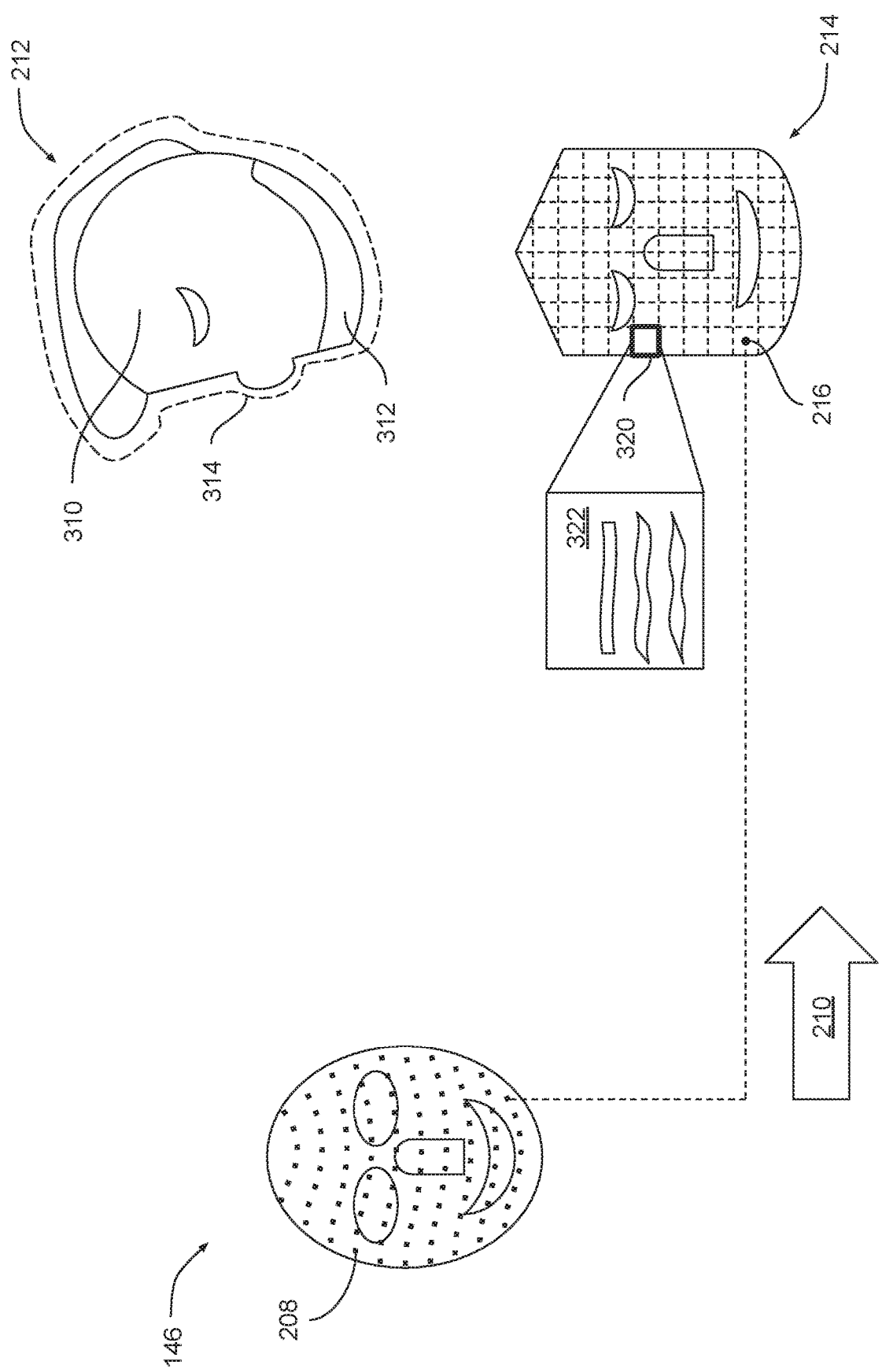
FIG. 3 illustrates how the retargeting engine of FIG. 1 implements an anatomical local model for retargeting a facial expression of a human performer onto a digital character, according to various embodiments.

FIG. 3 illustrates how the retargeting engine of FIG. 1 implements an anatomical local model for retargeting a facial expression of a human performer onto a digital character, according to various embodiments. As shown, performance capture data 146 depicts the face of performer 142 while enacting a facial expression. Retargeting engine 118 is configured to track the locations of a set of source positions 208 on the face of performer 142 when performer 142 enacts the various facial expressions.

As also shown, anatomical model 212 specifies a skull structure 310 and a jaw structure 312. Skull structure 310 and jaw structure 312 are at least partially covered by skin surface 314 that represents the face of the digital character. As further shown, local model 214 is divided into a plurality of patches 320. Each patch 320 may at least partially overlap with one or more adjacent patches. A given patch 320 corresponds to a local region of the face of the digital character and defines different geometrical configurations 322 the local region can assume when the digital character exhibits different facial expressions. A given geometrical configuration 322 generally corresponds to a surface feature associated with skin, such as a wrinkle or portion thereof, crease or portion thereof, and so forth. A given geometrical configuration 322 is generated to reflect a geometrical configuration of a local region of the face of performer 142 and can be derived from sample expressions 204.

ML model 210 is configured to map source positions 208 associated with facial areas of performer 142 to corresponding target positions 216 associated with facial areas of the digital character, once ML model 210 is trained in the manner described above in conjunction with FIG. 2. Target positions 216 are generally distributed sparsely relative to the facial areas of the digital character. Accordingly, positions that reside between target positions 216 are initially unknown. To address this issue, solver 220 is configured to deform anatomical model 212 and/or local model 214 in order to cause the surface of local model 214 to coincide with target positions 216, thereby interpolating these unknown positions and causing the digital character to exhibit the facial expression enacted by performer 142. The disclosed techniques are described in greater detail below in conjunction with FIG. 4.

Procedure for Retargeting Facial Expressions

Figure 4:
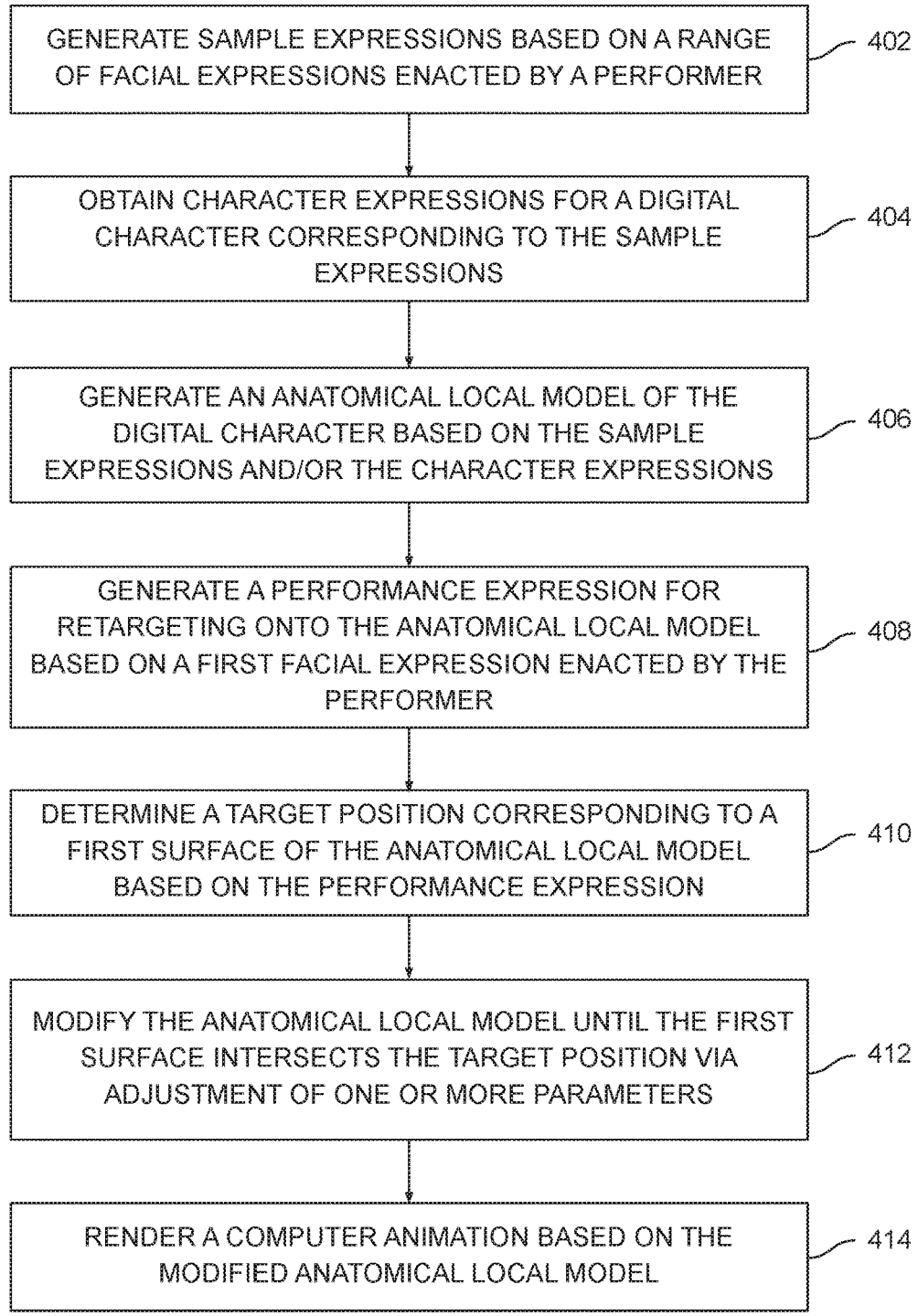
FIG. 4 is a flow diagram of method steps for retargeting a facial expression of a human performer onto a digital character, according to various embodiments.

FIG. 4 is a flow diagram of method steps for retargeting a facial expression of a human performer onto a digital character, according to various embodiments. Although the method steps are described in conjunction with the systems of FIGS. 1-3, persons skilled in the art will understand that any system configured to perform the method steps in any order falls within the scope of the present embodiments.

As shown, a method 400 begins at step 402, where one or more capture devices 144 within performance capture environment 140 of FIG. 1 generates sample expressions 204 within performance capture data 146. Sample expressions 204 reflect a range of facial expressions enacted by performer 142. Sample expressions 204 may include 2D images of performer 142 enacting one or more facial expressions, 3D video of performer 142 enacting one or more facial expressions, or a 3D model of performer 142 enacting one or more facial expressions. In one embodiment, sample expressions 204 may be generated to represent a range of facial expressions exhibited by a first digital character in order to facilitate remapping facial expressions associated with the first digital character onto a second digital character. In this embodiment, performance capture data 146 need not be captured based on performer 142.

At step 404, retargeting engine 118 obtains character expressions 202 for a digital character corresponding to sample expressions 204. A given character expression 202 includes data that represents the digital character exhibiting one of the facial expressions enacted by performer 142 when sample expressions 204 are generated. Each character expression 202 can be an image of the digital character exhibiting a corresponding facial expression, 3D geometry that defines the surface of the digital character when exhibiting a corresponding facial expression, and so forth. In one embodiment, each character expression 202 is generated using a 3D model of the digital character.

At step 406, retargeting engine 118 generates ALM 120 corresponding to the digital character based on at least one of sample expressions 204 or character expressions 202. ALM 120 specifies how the physical appearance of the digital character changes when the digital character exhibits different facial expressions and is used to perform the retargeting operations described herein. ALM 120 includes anatomical model 212 and local model 214. Anatomical model 212 defines the internal structure of the digital character, including the skull, jaw, and/or other skeletal features of the digital character. Local model 214 defines the external surface of the digital character, including the skin and/or other soft tissue features.

At step 408, retargeting engine 118 generates performance expression 206 for retargeting via ALM 120 based on a first facial expression enacted by the performer. Performance expression 206 may include 2D images of performer 142 enacting the first facial expression, 3D geometry of performer 142 enacting the first facial expression, and so forth. Performance expression 206 can be captured within performance capture environment 140. In one embodiment, performance expression 206 may be derived from a first digital character instead of performer 142 in order to facilitate performing remapping operations between the first digital character and a second digital character.

At step 410, retargeting engine 118 determines a target position associated with the digital character that corresponds to a first surface of ALM 120 based on performance expression 206. Retargeting engine 118 analyzes performance expression 206 to determine a source position 208 associated with a facial area of performer 142, and then implements ML model 210 to map that source position 208 to the target position 216. The target position 216 represents a location that the surface of ALM 120, defined via local model 214, should reside when the digital character exhibits the first facial expression.

At step 412, retargeting engine 118 modifies ALM 120 until the first surface intersects the target position 216 via adjustment of one or more parameters 218. In particular, solver 220 iteratively adjusts parameters 218 to deform ALM 120 until the surface of ALM 120 coincides with the target position 216 determined at step 410. Once deformed in this manner, ALM 120 represents the digital character exhibiting the first facial expression. At step 414, rendering module 230 renders computer animation 132 to depict the digital character exhibiting the first facial expression. Persons skilled in the art will understand how the above techniques can be applied to remap facial expressions derived from a first digital character onto a second digital character instead of remapping facial expressions derived from a performer onto a digital character.

In sum, a retargeting engine automatically performs a retargeting operation. The retargeting engine generates a set of sample expressions that include 3D geometry representing one or more facial expressions enacted by a performer. The retargeting engine also generates a set of character expressions that include 3D geometry representing a digital character exhibiting the one or more facial expressions. Based on the sample expressions and the character expressions, the retargeting engine generates an anatomical local model of the digital character. The anatomical local model includes an anatomical model corresponding to internal features of the digital character and a local model corresponding to external features of the digital character. The retargeting engine includes a Machine Learning model that is trained, based on the sample expressions and the character expressions, to map a set of locations associated with the face of the performer during a performance to a corresponding set of locations associated with the face of the digital character. The retargeting engine includes a solver that modifies a set of parameters associated with the anatomical local model to interpolate any remaining locations associated with the face of the digital character, thereby causing the digital character to exhibit one or more facial expressions enacted by the performer.

At least one technical advantage of the disclosed techniques relative to the prior art is that the disclosed techniques enable facial expressions made by a performer to be more accurately retargeted onto a digital character. Accordingly, computer animations can be generated that include digital characters having more realistic facial expressions that are more closely derived from human performers than computer animations generated using prior art approaches. Another technical advantage of the disclosed techniques relative to the prior art is that the disclosed techniques enable retargeting operations to be reliably performed even when the digital characters and the corresponding human performance have substantially different facial geometries. Accordingly, with the disclosed techniques the facial expressions of human performers can be mapped with reasonable accuracy onto a wider variety of digital characters than is possible with prior art approaches. These technical advantages represent one or more technological advancements over prior art approaches.

1. Some embodiments include a computer-implemented method for generating computer animations of digital characters, the method comprising generating a first model of a facial area of a first character based on first geometry, wherein the first geometry represents a facial area of the first character when the first character exhibits a range of facial expressions, determining a target position for a first surface associated with the facial area of the first character based on second geometry, wherein the second geometry indicates a source position associated with a facial area of a second character when the second character enacts a first facial expression, modifying the first model until the first surface intersects the target position to generate a second model of the facial area of the first character, and rendering a computer animation of the first character based on the second model.

2. The computer-implemented method of clause 1, wherein generating the first model comprises generating an anatomical model of an interior portion of the facial area of the first character based on an approximation of a skeletal portion of the facial area of the second character, and generating a local model of an exterior portion of the facial area of the first character based on a plurality of geometrical configurations associated with the facial area of the second character, wherein the local model defines at least one geometrical configuration associated with at least one local region of the facial area of the first character.

3. The computer-implemented method of any of clauses 1-2, wherein the first model specifies a skull portion and a jaw portion of the first character, and wherein the jaw portion moves relative to the skull portion to cause the first character to exhibit different facial expressions.

4. The computer-implemented method of any of clauses 1-3, wherein the first model includes a plurality of patches distributed across the facial area of the first character, and wherein each patch is configured according to a separate three-dimensional shape when the first character exhibits a particular facial expression.

5. The computer-implemented method of any of clauses 1-4, wherein generating the first model of the facial area of the first character is further based on character data that specifies one or more physical attributes of the first character.

6. The computer-implemented method of any of clauses 1-5, wherein a machine learning model is trained to determine different target positions for the first surface based on the first geometry and the second geometry, and wherein the first geometry indicates a plurality of target positions across the range of facial expressions, and the second geometry indicates a plurality of source positions associated with the second character.

7. The computer-implemented method of any of clauses 1-6, wherein modifying the first model comprises adjusting one or more parameters associated with the first model to cause the first surface to move towards the target position.

8. The computer-implemented method of any of clauses 1-7, wherein modifying the first model comprises performing an interpolation operation to generate one or more positions that are associated with the first surface and reside adjacent to the target position.

9. The computer-implemented method of any of clauses 1-8, wherein the second geometry is generated based on a set of images that is captured within a performance capture environment when the second character enacts the range of facial expressions, wherein the second character comprises a human performer.

10. The computer-implemented method of any of clauses 1-9, wherein each image included in the set of images corresponds to a different facial expression included in the range of facial expressions.

11. Some embodiments include a non-transitory computer-readable medium storing program instructions that, when executed by a processor, cause the processor to generate computer animations of digital characters by performing the steps of generating a first model of a facial area of a first character based on first geometry, wherein the first geometry represents a facial area of the first character when the first character exhibits a range of facial expressions, determining a target position for a first surface associated with the facial area of the first character based on second geometry, wherein the second geometry indicates a source position associated with a facial area of a second character when the second character enacts a first facial expression, modifying the first model until the first surface intersects the target position to generate a second model of the facial area of the first character, and rendering a computer animation of the first character based on the second model.

12. The non-transitory computer-readable medium of clause 11, wherein the step of generating the first model comprises generating an anatomical model of an interior portion of the facial area of the first character based on an approximation of a skeletal portion of the facial area of the second character, and generating a local model of an exterior portion of the facial area of the first character based on a plurality of geometrical configurations associated with the facial area of the second character, wherein the local model defines at least one geometrical configuration associated with at least one local region of the facial area of the first character.

13. The non-transitory computer-readable medium of any of clauses 11-12, wherein the first model specifies a skull portion and a jaw portion of the first character, and wherein the jaw portion moves relative to the skull portion to cause the first character to exhibit the first facial expression.

14. The non-transitory computer-readable medium of any of clauses 11-13, wherein the first model includes a plurality of patches distributed across the facial area of the first character, and wherein each patch is configured according to a separate three-dimensional shape when the first character exhibits a particular facial expression.

15. The non-transitory computer-readable medium of any of clauses 11-14, wherein the step of generating the first model of the facial area of the first character is further based on character data that specifies one or more geometrical shapes associated with the facial area of the first character when the first character exhibits the range of facial expressions.

16. The non-transitory computer-readable medium of any of clauses 11-15, wherein a machine learning model is trained to determine different target positions for the first surface based on the first geometry and the second geometry, and wherein the first geometry indicates a plurality of target positions across the range of facial expressions, and the second geometry indicates a plurality of source positions associated with the second character.

17. The non-transitory computer-readable medium of any of clauses 11-16, wherein the step of modifying the first model comprises deforming at least a portion of the first model, via adjustment of one or more parameters associated with the first model, to cause the first surface to move towards the target position.

18. The non-transitory computer-readable medium of any of clauses 11-17, wherein the step of modifying the first model comprises performing an interpolation operation to generate one or more positions that are associated with the first surface and reside adjacent to the target position.

19. The non-transitory computer-readable medium of any of clauses 11-18, wherein the second geometry is generated based on a first set of images that is captured within a performance capture environment when the second character enacts the range of facial expressions, and wherein each image included in the first set of images corresponds to a different facial expression included in the range of facial expressions.

20. Some embodiments include a system, comprising a memory storing a software application, and a processor that, when executing the software application, is configured to perform the steps of generating a first model of a facial area of a first character based on first geometry, wherein the first geometry represents a facial area of the first character when the first character exhibits a range of facial expressions, determining a target position for a first surface associated with the facial area of the first character based on second geometry, wherein the second geometry indicates a source position associated with a facial area of a second character when the second character enacts a first facial expression, modifying the first model until the first surface intersects the target position to generate a second model of the facial area of the first character, and rendering a computer animation of the first character based on the second model.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating computer animations of digital characters, the method comprising:
    generating a first model of a facial area of a first character based on first geometry, wherein the first geometry represents a facial area of the first character when the first character exhibits a range of facial expressions;
    determining a target position for a first surface associated with the facial area of the first character based on second geometry, wherein the second geometry indicates a source position associated with a facial area of a second character when the second character enacts a first facial expression;
    modifying the first model until the first surface intersects the target position to generate a second model of the facial area of the first character; and
    rendering a computer animation of the first character based on the second model.

2. The computer-implemented method of claim 1, wherein generating the first model comprises:
    generating an anatomical model of an interior portion of the facial area of the first character based on an approximation of a skeletal portion of the facial area of the second character; and
    generating a local model of an exterior portion of the facial area of the first character based on a plurality of geometrical configurations associated with the facial area of the second character, wherein the local model defines at least one geometrical configuration associated with at least one local region of the facial area of the first character.

3. The computer-implemented method of claim 1, wherein the first model specifies a skull portion and a jaw portion of the first character, and wherein the jaw portion moves relative to the skull portion to cause the first character to exhibit different facial expressions.

4. The computer-implemented method of claim 1, wherein the first model includes a plurality of patches distributed across the facial area of the first character, and wherein each patch is configured according to a separate three-dimensional shape when the first character exhibits a particular facial expression.

5. The computer-implemented method of claim 1, wherein generating the first model of the facial area of the first character is further based on character data that specifies one or more physical attributes of the first character.

6. The computer-implemented method of claim 1, wherein a machine learning model is trained to determine different target positions for the first surface based on the first geometry and the second geometry, and wherein the first geometry indicates a plurality of target positions across the range of facial expressions, and the second geometry further indicates a plurality of source positions associated with one or more facial areas of the second character.

7. The computer-implemented method of claim 1, wherein modifying the first model comprises adjusting one or more parameters associated with the first model to cause the first surface to move towards the target position.

8. The computer-implemented method of claim 1, wherein modifying the first model comprises performing an interpolation operation to generate one or more positions that are associated with the first surface and reside adjacent to the target position.

9. The computer-implemented method of claim 1, wherein the second geometry is generated based on a set of images that is captured within a performance capture environment when the second character enacts the range of facial expressions, wherein the second character comprises a human performer.

10. The computer-implemented method of claim 9, wherein each image included in the set of images corresponds to a different facial expression included in the range of facial expressions.

11. A non-transitory computer-readable medium storing program instructions that, when executed by a processor, cause the processor to generate computer animations of digital characters by performing the steps of:
generating a first model of a facial area of a first character based on first geometry, wherein the first geometry represents a facial area of the first character when the first character exhibits a range of facial expressions;
determining a target position for a first surface associated with the facial area of the first character based on second geometry, wherein the second geometry indicates a source position associated with a facial area of a second character when the second character enacts a first facial expression;
modifying the first model until the first surface intersects the target position to generate a second model of the facial area of the first character; and
rendering a computer animation of the first character based on the second model.

12. The non-transitory computer-readable medium of claim 11, wherein the step of generating the first model comprises:
generating an anatomical model of an interior portion of the facial area of the first character based on an approximation of a skeletal portion of the facial area of the second character; and
generating a local model of an exterior portion of the facial area of the first character based on a plurality of geometrical configurations associated with the facial area of the second character, wherein the local model defines at least one geometrical configuration associated with at least one local region of the facial area of the first character.

13. The non-transitory computer-readable medium of claim 11, wherein the first model specifies a skull portion and a jaw portion of the first character, and wherein the jaw portion moves relative to the skull portion to cause the first character to exhibit the first facial expression.

14. The non-transitory computer-readable medium of claim 11, wherein the first model includes a plurality of patches distributed across the facial area of the first character, and wherein each patch is configured according to a separate three-dimensional shape when the first character exhibits a particular facial expression.

15. The non-transitory computer-readable medium of claim 11, wherein the step of generating the first model of the facial area of the first character is further based on character data that specifies one or more geometrical shapes associated with the facial area of the first character when the first character exhibits the range of facial expressions.

16. The non-transitory computer-readable medium of claim 11, wherein a machine learning model is trained to determine different target positions for the first surface based on the first geometry and the second geometry, and wherein the first geometry indicates a plurality of target positions across the range of facial expressions, and the second geometry further indicates a plurality of source positions associated with one or more facial areas of the second character.

17. The non-transitory computer-readable medium of claim 11, wherein the step of modifying the first model comprises deforming at least a portion of the first model, via adjustment of one or more parameters associated with the first model, to cause the first surface to move towards the target position.

18. The non-transitory computer-readable medium of claim 11, wherein the step of modifying the first model comprises performing an interpolation operation to generate one or more positions that are associated with the first surface and reside adjacent to the target position.

19. The non-transitory computer-readable medium of claim 11, wherein the second geometry is generated based on a first set of images that is captured within a performance capture environment when the second character enacts the range of facial expressions, and wherein each image included in the first set of images corresponds to a different facial expression included in the range of facial expressions.

20. A system, comprising:
a memory storing a software application; and
a processor that, when executing the software application, is configured to perform the steps of:
generating a first model of a facial area of a first character based on first geometry, wherein the first geometry represents a facial area of the first character when the first character exhibits a range of facial expressions,
determining a target position for a first surface associated with the facial area of the first character based on second geometry, wherein the second geometry indicates a source position associated with a facial area of a second character when the second character enacts a first facial expression,
modifying the first model until the first surface intersects the target position to generate a second model of the facial area of the first character, and
rendering a computer animation of the first character based on the second model.

* * * * *